United States Patent [19]

Cossé

[11] Patent Number: 4,469,219

[45] Date of Patent: Sep. 4, 1984

[54] METHOD AND INSTALLATION FOR REGULARIZING THE TRANSFER OF IDENTICAL SOLID PRODUCTS

[75] Inventor: Lionel Cossé, Nantes, France

[73] Assignee: Biscuiterie Nantaise - BN, Nantes, France

[21] Appl. No.: 343,058

[22] Filed: Jan. 27, 1982

[30] Foreign Application Priority Data

Feb. 3, 1981 [FR] France .................. 81 02045

[51] Int. Cl.³ .................................. B65G 47/26
[52] U.S. Cl. ........................ 198/460; 198/594; 198/812
[58] Field of Search ............ 198/460, 461, 594, 462, 198/424, 425, 435, 544, 812

[56] References Cited

U.S. PATENT DOCUMENTS

| 2,706,053 | 4/1955 | Doller | 198/460 |
| 3,305,069 | 2/1967 | Griner | 198/452 |
| 3,374,875 | 3/1968 | Griner | 198/462 |
| 3,751,873 | 8/1973 | Toby | 198/460 |
| 4,155,441 | 5/1979 | Albrecht et al. | 198/424 |
| 4,210,237 | 7/1980 | Gram | 198/461 |

FOREIGN PATENT DOCUMENTS

| 124071 | 1/1973 | Denmark | 198/425 |
| 1273419 | 7/1968 | Fed. Rep. of Germany | |
| 2333734 | 1/1975 | Fed. Rep. of Germany | |
| 1576718 | 10/1980 | United Kingdom | 198/425 |
| 548504 | 3/1977 | U.S.S.R. | 198/812 |

Primary Examiner—Robert J. Spar
Assistant Examiner—Jonathan D. Holmes
Attorney, Agent, or Firm—Karl W. Flocks; Sheridan Neimark; A. Fred Starobin

[57] ABSTRACT

A method of and apparatus for continuously regularizing the transfer of solid products having a maximum input spacing on an input conveyor, onto an output conveyor on which these products have a constant minimum output spacing, with a spillway between the conveyors mounted on a movable carriage which is displaced either upstream or downstream of the product movement depending on the delivery rate between conveyors.

4 Claims, 3 Drawing Figures

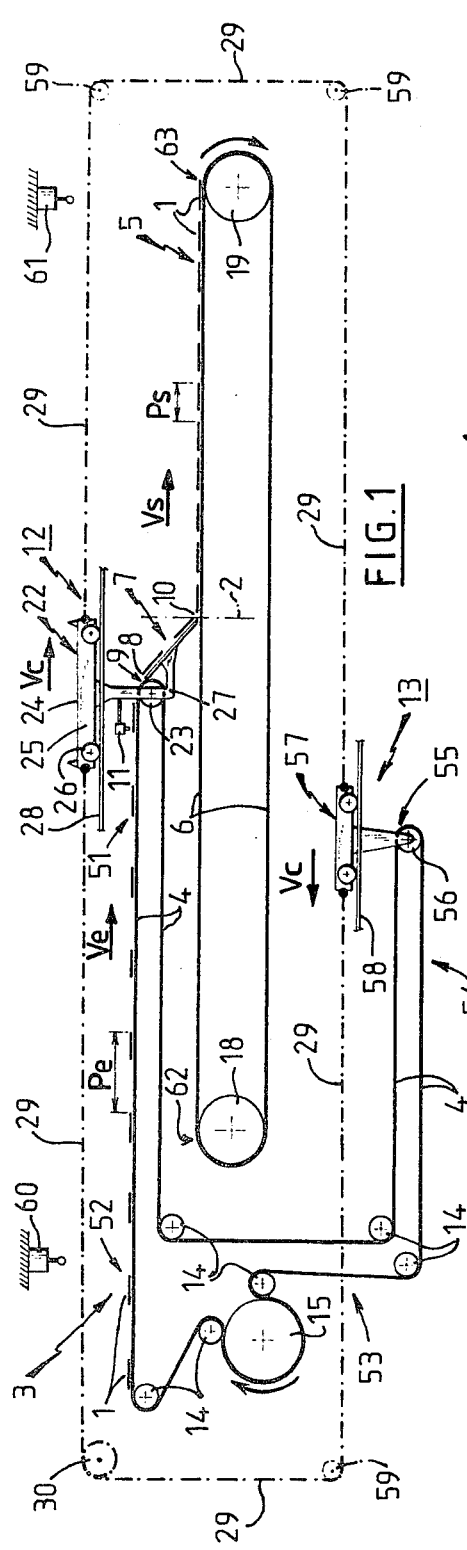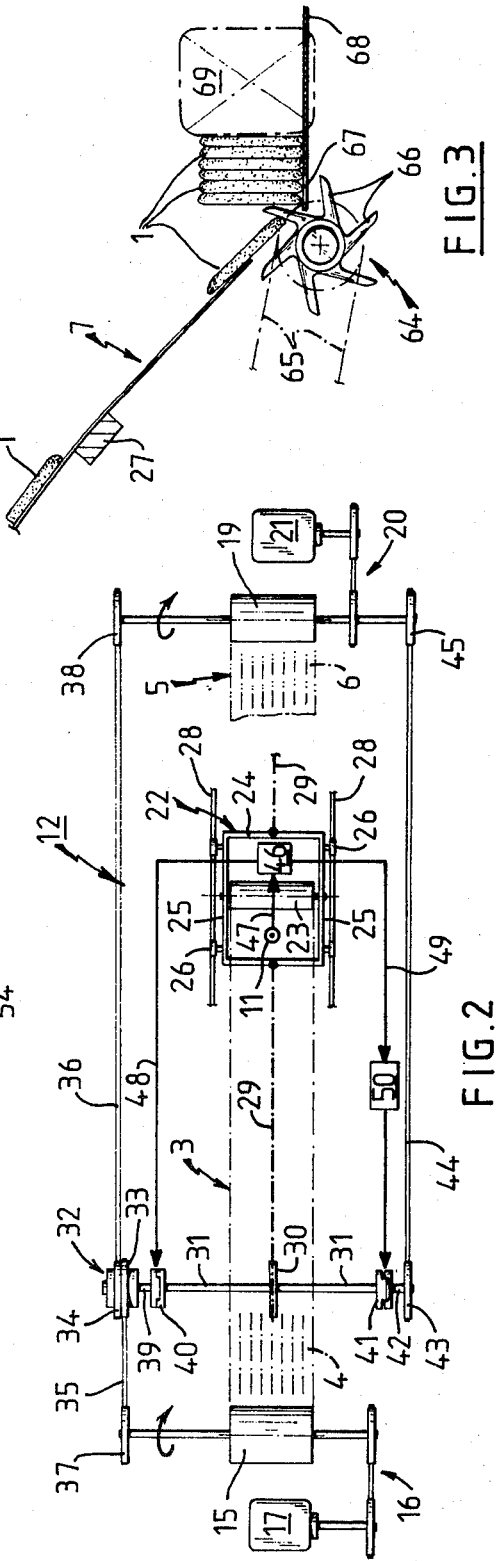

METHOD AND INSTALLATION FOR REGULARIZING THE TRANSFER OF IDENTICAL SOLID PRODUCTS

BACKGROUND OF THE INVENTION

The present invention relates to a method for regularizing continuously the transfer of identical solid products, such as biscuits, between an upstream delivery apparatus and a downstream receiving apparatus. The invention also covers an installation for practising the foregoing method.

In the field of mass production, it is known that it is frequently necessary to absorb production discordances between two consecutive machines forming part of a manufacturing chain. To this end, numerous intermediate installations have already been developed, particularly more or less complex storage installations. However these known installations involve immobilization of the products which is particularly prejudicial to the efficiency of the installation, even to the quality of the products when the latter are capable of undergoing alteration in time. In addition, these installations are generally poorly adapted to the storage of fragile products and, in the particular case of biscuits, the additional handling involves frequently deterioration of a certain number of products.

SUMMARY OF THE INVENTION

It is an object of the present invention to overcome these drawbacks by providing a method and an installation for transferring rapidly and without discordances identical solid products between two machines of a manufacturing chain, the transfer being carried out without the risk of deterioration in the case of fragile products.

In accordance with the invention, in the method for regularizing the transfer of identical solid products between an upstream delivery apparatus and a downstream receiving apparatus, the products emerging from the delivery apparatus presenting themselves in line and resting flat on their largest surface, the products coming from the upstream apparatus are transported in line with a maximum constant spacing, a reduction in spacing is effected by determining a spacing changing front, and then the products are transported in line with a constant minimum spacing to the downstream apparatus, and, simultaneously, the presence of products before their spacing reduction is detected and the front is moved towards one or other apparatus as a function of the relative delivery rate of these two apparatuses.

According to other features of the method:

the spacing of the products is reduced whilst straightening them to cause them to pass from their flat position to an inclined or edgewise position;

several parallel lines of products are processed simultaneously.

For the practising of the aforementioned method, the installation according to the invention comprises essentially an input endless conveyor belt driven with an input speed adapted to the delivery rate of the upstream delivery apparatus, an output endless conveyor belt driven with an output speed less than or equal to the input speed and adapted to the delivery rate of the downstream receiving apparatus, a spillway whose input is associated with the downstream end of the input conveyor belt and whose output is arranged above the output conveyor belt, and a detector for the presence of the products on the belt of the input conveyor, connected to means for moving the spillway and the downstream end of the input conveyor belt and to means for maintaining the tension of the belt of the input conveyor.

According to other features of the installation:

the displacement means comprise a carriage, on which are mounted the fixed spillway and an idling roller forming the downstream end of the input conveyor belt, a differential pulley of which the two inputs members are respectively connected to drive means for the input and output conveyor belts and of which the output member is connected to the carriage through a first clutch means, a second clutch means mounted between the drive means of the output conveyor belt and the carriage, and a two-position switch, whose input control circuit is connected to the detector, of which one output is connected directly to the control member of the first clutch means and of which the other output is connected to the control member of the second clutch means, possibly through a time delay element;

the input and output conveyors are parallel to one another and preferably horizontal, the input conveyor belt including a downstream portion partly covering the output conveyor and the carriage being mounted on rails parallel to said conveyors;

the input conveyor comprises, preferably at the level of its upstream part, a bent lower extension, whose terminal arm is arranged parallel to the output conveyor and below the latter and whose end includes a roller which is identical with the roller forming the downstream end of the input conveyor and which is mounted for rotation in a second carriage supported by rails parallel to the rails associated with the said downstream end, the means for maintaining tension in the belt of the input conveyor further comprising a chain intended to subject the second carriage to an equal displacement and of direction opposite that of the carriage associated with the downstream end of said input conveyor.

BRIEF DESCRIPTION OF THE DRAWINGS

Other features and advantages of the invention will emerge better from the description which follows, taken in conjunction with the accompanying drawings in which:

FIG. 1 shows a diagramatic view of an installation for practising the method according to the invention;

FIG. 2 shows a diagramatic view of the means for deplacement of the spillway forming part of the installation shown in FIG. 1; and FIG. 3 shows a partial diagramatic view of the installation FIG. 1, the spillway including a paddle-wheel for straightening the products.

In these drawings, the same reference numerals denote the same elements.

DESCRIPTION OF THE PREFERRED EMBODIMENTS

Referring to FIGS. 1 to 3, the method for regularizing continuously the transfer of identical solid products 1 between an upstream delivery apparatus (not shown) and a downstream receiving apparatus (not shown) is of the type in which the products emerging from the delivery apparatus are presented in line and rest flat on their largest surface. For example, the products 1 maybe biscuits coming from a manufacturing machine and destined for a packaging machine, the transfer of the biscuits having to be carried out continuously and without discordances between the two machines.

According to the invention, the products 1 coming from the upstream apparatus are transported in line with a constant maximum input spacing $P_e$, a reduction in spacing is effected by determining a spacing change front 2, then the products 1 are transported in line with a constant minimum output spacing $P_s$ as far as the downstream apparatus. Simultaneously, the presence of products 1 before their spacing reduction is detected and, as will be explained below in more detail, the front 2 is displaced towards one or other apparatus as a function of the relative delivery rate of the two apparatuses.

Due to the fact that the input spacing $P_e$ and the output spacing $P_s$ are kept constant, the reduction in spacing obviously has a fixed value. In the case where a low value of reduction in spacing is selected, it is customarily possible to maintain the products after the spacing change front 2, in the same flat position as that they occupied before reaching said front. However, in the most frequent case, a large value of spacing reduction is preferred in order to increase the storage capacity of the installation. Under these conditions, the output spacing $P_s$ must generally have a value less than the length of the supporting surface of each of the products and, to achieve this result, the spacing of the products 1 is reduced whilst straightening them to cause them to pass them from their flat position to an inclined or edgewise position.

In addition, according to another feature of the method according to the invention, several parallel lines of products 1 are processed simultaneously for example eight parallel lines, the spacing change front 2 being preferably located at the same level for all the lines.

With reference more particularly to FIGS. 1 and 2, the installation for practising the abovementioned method comprises essentially an input conveyor 3 with an endless belt 4, and output conveyor 5 with an endless belt 6, and spillway 7, whose input 8 is associated with the downstream end 9 of the input conveyor 3 and whose output 10 is arranged above the belt 6 of the output conveyor 5, and a detector 11 for the presence of the products 1 on the belt 4 of the input conveyor 3, this detector being connected to means 12 for the displacement of the spillway 7 and of the downstream end 9 of conveyor 3 and to means 13 for maintaining tension in the belt 4 of said input conveyor 3.

The endless belt 4 of the output conveyor 3 is driven with an input speed $V_e$ adapted to the delivery rate of the upstream delivery apparatus. According to a possible embodiment, the belt 4 is inextensible and wound around a certain number of idling rollers 14 arranged so as to keep it taut, whilst it is driven by a drum 15 whose speed is slaved to the operation of the upstream delivery apparatus, for example through a pulley and belt device 16 coupled to a motor 17 synchronized with the delivery rate of the upstream delivery apparatus.

In the same way the endless belt 6 of the output conveyor 5 is driven with an output speed $V_s$ which is adapted to the delivery rate of the downstream receiving apparatus, the output speed $V_s$ being less than or equal to the input speed $V_e$ of the input conveyor 3. According to a possible embodiment, the belt 6 is inextensible and wound, with the desired tension, around an idling roller 18 and a drum 19, the latter being drivable by a pulley belt device 20 coupled to a motor 21 synchronized with the delivery rate of the downstream receiving apparatus.

According to the invention, the displacement means 12 which are associated with the spillway 7 and the downstream end 9 of the input conveyor 3, under the control of the detector 11 of the presence of the products 1 on the belt 4 of said conveyor, comprise essentially a carriage 22 on which are mounted the fixed spillway 7 and an idling roller 23 forming part of the rollers 14 and forming the downstream end 9 of the input conveyor belt 3. For example, the carriage 22 may comprise a rectangular frame 24 whose side surfaces 25 are provided with wheels 26 and have lugs 27 supporting both the spillway 7 and the axle of the roller 23. The spillway 7 can be constituted by a simple inclined slideway so that its input 8 is arranged opposite the roller 23 forming the downstream end of the input conveyor 3 and its output 10 is held above the belt 6 of the output conveyor 5. In addition, the detector 11 maybe mounted directly on the carriage 22, it being understood that it suffices to check the presence or absence of the products 1 on one only of the lines of the input conveyor 3 to the extent that the upstream delivery apparatus delivers the products 1 simultaneously to all the lines in service of said conveyor.

When several lines of products 1 are thus processed simultaneously, for example eight lines, it is clear that the input conveyor 3, the spillway 7 and the output conveyor 5 may include line separating members (not shown) designed to maintain the products in line during their transfer between the upstream delivery apparatus and the downstream receiving apparatus.

In general, to the extent that the output speed be $V_s$ is less than the input speed $V_e$, an output spacing $P_s$ is obtained less than the input spacing $P_e$, the reduction in spacing being carried out at the level of the spillway 7 and the spacing changing front 2 can be considered as positioned vertically over the input 8 of the spillway or, preferably, vertically over the exit 10 of said spillway 7. In all cases, to move the front 2 towards one or other of the upstream and the downstream apparatuses according to the relative delivery rate of these two apparatuses, it suffices to move the carriage 22 over rails 28 parallel to the input conveyor 3, for example by means of an endless chain 29 fixed to the frame 24 and wound over a drive pinion 30 fast to a shaft 33 which is driven in rotation as a function of the delivery rates of the two apparatuses, that is to say according to the speeds of the drums 15 and 19, the latter being respectively driven by motors 17 and 21 synchronized with said delivery rates, as previously indicated.

For this purpose, the displacement means 12 may comprise differential pulley 32 whose two input members 33 and 34 are respectively connected to the drive means of the input and output belt conveyors 3 and 5, that is to say, to the corresponding drums 15 and 19, through respective belts 35 and 36 and pulleys 37 and 38, and of which the output member 39 is connected to the drive shaft 31 of the carriage 22 through a a first clutch 40, a second clutch 41 being mounted between the drive means of the output conveyor belt 5 and the carriage 22, that is to say between the drive shaft 31 of the carriage 22 and a shaft 42 fast to pulley 43 which is connected by a belt 44 to another pulley 45 rendered fast to the drum 19 corresponding to the output conveyor.

Due to the fact that the clutches 40 and 41 both actuate the drive shaft 31 of the carriage 22, they are preferably arranged on both sides of the pinion 30 and it is obvious that when one of the clutches is in the engaged state, the other must be in the disengaged state. To obtain this result, the displacement means 12 can comprise, for example, a two-position switch 46, whose input control circuit 47 is connected to the detector 11 of which one output 48 is connected directly to the control member of the first clutch 40 and of which the other output 49 is connected to the control member of the second clutch 41, possibly through a time delay element 50 whose use will be explained below with reference to the operation of the whole of the regularizing installation according to the invention.

As regards the input and the output conveyors 3 and 5, the fact of selecting conveyors of the endless belt type implies that the active strand of each belt, that is to say the section supporting the products 1, is held straight, which permits the same spacing to be preserved simultaneously for all the lines of the belt concerned. Under these conditions, if the conveyors 3 and 5 are arranged obliquely with respect to one another, it is necessary for the spillway 7 to include curvilinear guide members associated with each line, the products 1 delivered to two neighbouring lines of the output conveyor 5 being then offset according to the difference of drop times corresponding to the two lines. In the particular case where the conveyors 3 and 5 are mounted perpendicularly to one another, it appears even more clearly that the active strand of the input conveyor 3 must pivot around its upstream end by effecting a movement of circular type which is obviously not directly proportional to the rectilinear displacement of the carriage.

Taking into account the difficulties to be overcome to make the active strand of the input conveyor 3 pivoting, it is particularly advantageous to construct the installation according to the invention so that the input and output conveyors 3 and 5 are parallel to one another and preferably horizontal, the input conveyor 3 including a downstream portion 51 partially covering the output conveyor 5 and the carriage 22 being mounted on rails 28 parallel to the two conveyors.

According to another feature of the invention, the input conveyor 3 comprises, preferably at the level of its upstream part 52, a bent lower extension 53 whose terminal arm 54 is arranged parallel to the output conveyor 5 and below the latter. The end 55 of the terminal arm 54 includes a roller 56 which is identical with the roller 23 forming the downstream end 9 of the input conveyor 3 and which is mounted for rotation in a second carriage 57 supported by rails 58 parallel to the rails 28 associated with the downstream end 9.

The aforesaid means 13 holding the tension in the belt 4 of the input conveyor 3 may then comprise a chain or other member intended to subject the second carriage 57 to a displacement equal and opposite in direction to that of the carriage 22 associated with the downstream end 9 of the input conveyor 3. Referring to the embodiment previously described, it suffices to extend the chain 29, fast to the carriage 22 and in engagement with the drive pinion 30, by making it pass around idling pinions 59 and by fixing it to the second carriage 57 to compensate on the belt 4 of the input conveyor any movement of the carriage 22. Taking into account the arrangement of the carriages 22 and 57 above or below the associated ends 9 and 55 of the input conveyor 3, it is generally necessary to mount the chain 29 on one side or the other of the belt 4, even to split it on each side of the conveyor.

In addition, the installation according to the invention comprises also upstream and downstream stroke end switches, 60 and 61, which are respectively arranged close to the upstream and downstream ends 62 and 63, of the output conveyor 5 and which cooperate with the carriage 22 associated with the spillway 7 to interrupt the respective operations of the upstream delivery apparatus and of the downstream receiving apparatus.

Referring more particularly to FIG. 3, in the case where it is desired to reduce the spacing of the products 1 whilst straightening them to make them pass from their flat position to an inclined or edge-wise position, the installation according to the invention may comprise a mill-wheel or paddle-wheel 64 for straightening the products. This mill-wheel is obviously arranged at the exit of the spillway 7 and its rotary speed is adapted to the speed of the input conveyor 3, for example by means of a belt 65 driven by the drum 15, taking into account the number vanes 66 of the mill-wheel. Each vane is generally constituted by a comb with some teeth capable of passing freely, either between the ribands or strands forming the belt 6 of the output conveyor 5, or preferably, between the intercalary teeth 67 cutout of a guide member 68 provided with sliding wedges 69 and intended to bring the products 1 up to the belt 6. In all cases, the output conveyor 5 must include members (not shown) designed to hold the products inclined or on edge.

In using the installation according to the invention, the carriage 22 is generally moved at a speed $V_c$ which depends on the difference in speeds of the two conveyors 3 and 5 and, consequently, on the relative delivery rate of the upstream and downstream apparatuses, obviously taking into account the input and output spacings, particularly at the level of the two input members of the differential pulley 32. When the upstream and downstream apparatuses each operate with a normal delivery rate, the carriage does not move. The delivery rate of the downstream apparatus being fixed and consequently the speed $V_s$ of the output conveyor 5 being constant, any variation in the delivery rate of the downstream delivery apparatus and consequently of the speed $V_e$ of the input conveyor 3, determines a slow movement of the carriage 22 upstream or downstream according as the input delivery rate is greater than or less than the normal.

In fact, when the products 1 pass normally under the detector 11, the latter holds switch 46 swung into a first position which the clutch 40 is in the clutched condition, so that the shaft 31 driving the carriage 22 is connected to the output member 39 of the differential pulley 32. The speed of the carriage 22 depends then on the difference in speeds of the drums 15 and 19, that is to say on the relative delivery rate of the upstream and downstream apparatuses, it being understood that the compensation carriage 57 is moved with a speed equal and in opposite direction to that of the carriage 22.

When a row of products 1 is lacking, the detector 11 causes the switch 46 to swing over into a second position for which the time delay element 50 is triggered whilst the clutch 40 is disengaged, which temporarily stops the carriage 22.

In the case where a second row of products 1 is lacking, the detector 11 holds the switch 46 in its second position and the time delay element 50 then causes the clutch 41 to pass into the engaged condition, so that the shaft 31 is connected to the shaft 42 and, consequently, to the drum 19, the carriage 22 then moving at the same speed and in the same direction as the output conveyor 5.

In the case where the following row of products 1 is present, the detector 11 causes the swinging over of the switch 46 into its first position, thus causing the clutch 40 to pass into the engaged state and determining the return of the time delay element 50 to its initial state as well as the return of the clutch 41 to the disengaged state.

It should be noted that in the case where only a single row of products 1 is lacking, the detector 11 brings the time delay element 50 back into its initial state before even the latter has caused the clutch 41 to pass to the engaged state, which enables operating discordances of the carriage for each isolated lacking row to be avoided. However, it is obvious that this time delay element could be eliminated. Conversely, a time delay element must be necessarily associated with the detector 11, the period of the time delay having to be slightly less than the input spacing of the products.

In the particular case where the operation of the upstream delivery apparatus is interrupted, the drum 15 stops, unless it is provided with a particular control mechanism designed to maintain the speed of the input conveyor 3 in order to eliminate all products still to be found on the belt 4. In all cases the carriage 22 moves downstream until it reaches a position for which it actuates the downstream stroke-end switch 61 which interrupts the operation of the downstream receiving apparatus and of the drum 19, thus stopping the output conveyor 5.

Conversely, when the downstream receiving apparatus stops first and thus stops the movement of the output conveyor 5, the carriage 22 moves upstream to a position for which it acts on upstream stroke-end switch 60 which interrupts the operation of the upstream delivery apparatus and of the input conveyor 3.

It is well understood that the present invention has only been described and illustrated by way of explanation but which is no way limiting and that any useful modification could be introduced therein, particularly in the field of technical equivalents, without departing from its scope.

What is claimed is:

1. Installation for regularizing continuously the transfer of identical solid products between an upstream delivery apparatus supplying input products with a maximum input spacing and a downstream receiving apparatus accepting said products with a constant minimum output spacing, including:
    an input conveyor comprising an upstream end and a downstream end connected by an endless belt coupled to drive means and actuated with an input speed adapted to the delivery rate of said upstream delivery apparatus,
    a means for maintaining the tension of said belt of the input conveyor,
    an output conveyor comprising an upstream end and a downstream end connected by an endless belt coupled to drive means and actuated with an output speed less than said input speed,
    a spillway whose input is associated with said downstream end of the input conveyor and whose output is arranged above said belt of the output conveyor,
    a displacement means for said spillway and said downstream end of the input conveyor comprising a first carriage on which are mounted said spillway and an idling roller forming said downstream end of the input conveyor belt, a differential pulley of which the two input members are respectively connected to said drive means of said input and output conveyor belts and of which the output member is connected to said first carriage through a first clutch, a second clutch being mounted between said drive means for said output conveyor belt and said first carriage, a two-position switch, of which one output is connected directly to the control member of said first clutch and of which the other output is connected to the control member of said second clutch through a time delay element, and
    a detector of the presence of said input products on said belt of the input conveyor coupled to said means for maintaining the tension of said belt of the input conveyor and coupled to the input control circuit of the two-position switch of said displacement means.

2. Installation according to claim 5, wherein said input and output conveyors are parallel to one another and preferably horizontal, said input conveyor including a downstream portion partly covering said output conveyor and said first carriage being mounted on rails parallel to said conveyors.

3. Installation according to claim 1, wherein said input conveyor comprises, at the level of its upstream portion, a bent lower extension having a terminal arm arranged parallel to said output conveyor and below the latter, the end of said terminal arm including a roller which is identical with said roller forming said downstream end of the input conveyor which is mounted for rotation in a second carriage supported by rails parallel to rails associated with said downstream end, said means for maintaining the tension of said input conveyor belt comprising a chain intended to subject said second carriage to a displacement equal and opposite in direction to that of said first carriage associated with said downstream end of the input conveyor.

4. Installation according to claim 1, including upstream and downstream stroke-end switches, respectively arranged close to said upstream and downstream ends of the output conveyor and cooperating with said first carriage associated with said spillway to interrupt the respective operation of said upstream delivery apparatus and of said downstream receiving apparatus.

* * * * *